Sept. 12, 1933.         E. A. GIARD                1,926,846
         ELECTRODE FOR ELECTRON DISCHARGE DEVICES
                    Filed Aug. 15, 1931
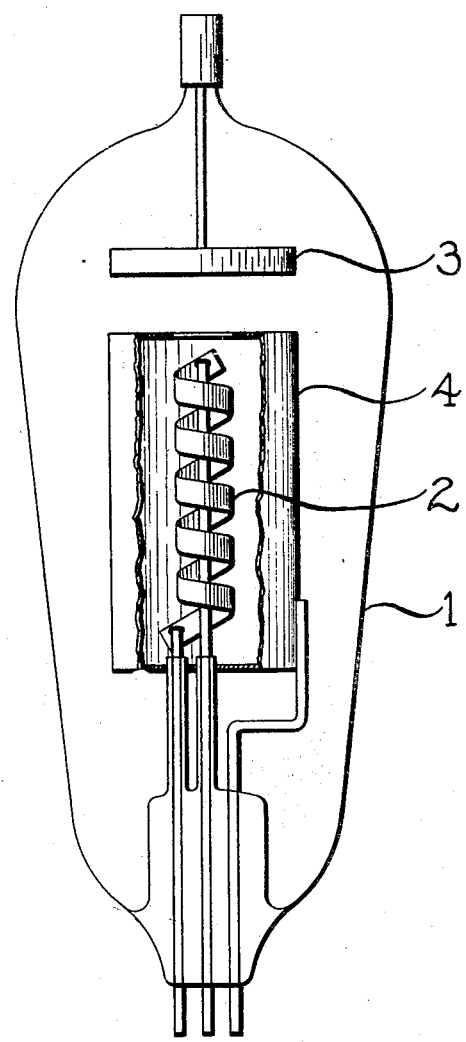
Inventor
Eugene A. Giard
By Frank Hubbard
    Attorney Patented Sept. 12, 1933

1,926,846

UNITED STATES PATENT OFFICE 1,926,846

ELECTRODE FOR ELECTRON DISCHARGE DEVICES

Eugene A. Giard, Shorewood, Wis., assignor to Cutler-Hammer, Inc., Milwaukee, Wis., a corporation of Delaware Application August 15, 1931. Serial No. 557,221

2 Claims. (Cl. 250—27.5)

This invention relates to an improved material for control electrodes or grids of electron tubes.

It has been found that control electrodes may produce secondary emission when they become heated, due to conduction and radiation from the heated cathode adjacent thereto, or due to bombardment by electrons or ions. Such secondary emission has been reduced in the past by using tantalum metal and oxidizing it superficially, the tantalum oxide preventing or greatly reducing secondary emission. Tantalum, however, is a very rare metal and very expensive.

An object of the invention is to provide a control electrode which is inexpensive to manufacture and which yet has the desirable characteristics of control electrodes which heretofore have been manufactured of a high grade and expensive material.

Another object is to provide a control electrode of rugged construction and made of a relatively inexpensive material with a coating which prevents secondary emission.

Another object is to provide a control electrode having an oxidized tantalum surface and requiring a minimum of tantalum metal.

The accompanying drawing shows one form of electron tube with which the present invention may be employed, it being understood, however, that the invention is advantageous in connection with other types of tubes employing a control electrode.

In the drawing, 1 designates a glass or other container which in the present case may be filled with a highly attenuated gas or with mercury vapor, 2 is a heated cathode and 3 an anode, while 4 is the control electrode consisting in the present case of an imperforate metal sheet which completely encloses the cathode except for openings at its upper end opposite the anode. In the past such control electrodes which were made of pure tantalum were subsequently oxidized superficially.

According to the present invention the grid is made of an alloy preferably a nickel tantalum alloy containing up to 30% tantalum. Very satisfactory results have been obtained with an alloy consisting of 80% nickel and 20% tantalum. After the grid has been given the desired shape the surface is oxidized by heating it in air. This produces on the surface a layer consisting of a mixture of the oxides of nickel and tantalum. After the tube is completed it is again heated during the exhausting process by means of a high frequency current induced in the conducting elements. This heating either reduces or vaporizes the nickel oxide or does both and leaves a substantially pure tantalum oxide film on the surface of the grid.

Another method which has successfully been employed consists in coating the surface of the grid which may be of nickel or another metal with finely divided tantalum and subsequently oxidizing the latter. If the tantalum is deposited on the nickel sheet by means of a so-called spray gun, the finely divided particles of the tantalum are partially oxidized during the spraying process so that the surface of the grid after spraying is largely coated with tantalum oxide. A grid which was prepared in this manner showed characteristics comparable to the favorable characteristics of the grid produced by the first mentioned method.

While the invention is described in connection with a gaseous electron tube, it may also be employed with high vacuum and other types of tubes having a control electrode subject to secondary emission.

What I claim as new and desire to secure by Letters Patent is:

1. A grid for an electron discharge tube comprising an alloy of tantalum and a base metal, said alloy being surfaced with a layer of substantially pure tantalum oxide.

2. A grid for an electron discharge tube comprising an alloy of nickel and tantalum containing not more than 30% of tantalum, said grid being surfaced with a substantially pure tantalum oxide coating.

EUGENE A. GIARD.